United States Patent …

(12) United States Patent
Murakami et al.

(10) Patent No.: US 7,781,906 B2
(45) Date of Patent: Aug. 24, 2010

(54) BURGLARPROOF DEVICE OF VEHICLE

(75) Inventors: Katsumi Murakami, Hiroshima (JP); Takuji Oka, Hatsukaichi (JP); Takayuki Furukawa, Higashihiroshima (JP)

(73) Assignee: Mazda Motor Corporation (JP)

( * ) Notice: Subject to any disclaimer, the term of this patent is extended or adjusted under 35 U.S.C. 154(b) by 185 days.

(21) Appl. No.: 12/190,262

(22) Filed: Aug. 12, 2008

(65) Prior Publication Data

US 2009/0064742 A1   Mar. 12, 2009

(30) Foreign Application Priority Data

Sep. 6, 2007   (JP) .............................. 2007-231805

(51) Int. Cl.
B25R 25/00   (2006.01)
(52) U.S. Cl. ..................................... 307/10.2
(58) Field of Classification Search ................. 307/10.2
See application file for complete search history.

(56) References Cited

FOREIGN PATENT DOCUMENTS

| | | |
|---|---|---|
| JP | 2001-001865 | 9/2001 |
| JP | 2003-293923 | 10/2003 |

OTHER PUBLICATIONS

U.S. Appl. No. 11/338,780, filed Aug. 2006, Takeharu Yamashita.*

* cited by examiner

Primary Examiner—Robert L. Deberadinis
(74) Attorney, Agent, or Firm—Studebaker & Brackett PC; Donald R. Studebaker

(57) ABSTRACT

A drive of a steering-lock actuator is controlled such that a lock member takes a steering lock state from a steering unlock state if there occurs a change in the state of a vehicle door detected by a door-state detecting device and a stop state of the vehicle is detected by a vehicle-stop-state detecting device when an ignition switch is in an OFF state (step S7). A power supply to the vehicle-stop-state detecting device is made stop if the ignition switch is turned to the OFF state from an ON state (step S2), and the power supply to the vehicle-stop-state detecting device resumes if there occurs the change in the state of the vehicle door detected by the door-state detecting device when the ignition switch is in the OFF state (step S4).

5 Claims, 3 Drawing Sheets

BURGLARPROOF DEVICE OF VEHICLE

BACKGROUND OF THE INVENTION

The present invention relates to a burglarproof device of a vehicle which controls a drive of a steering-lock actuator for selectively taking a steering lock state or a steering unlock state.

Installing a smart key-less entry system to vehicles, such as automotive vehicles, has been recently proposed for improvements of operability. The smart key-less entry system enables a door lock or unlock by operating a switch provided at or near an outer handle of a vehicle door when a portable device is carried by a vehicle passenger, or an engine start or stop by operating a push or rotational type of ignition switch provided in a vehicle compartment when the portable device is in the vehicle compartment.

Meanwhile, the vehicles are equipped with a steering lock mechanism to improve the vehicle burglarproof function. The steering lock mechanism prevents a rotational operation of a vehicle steering when the vehicles are parked. In the steering lock mechanism of the vehicles equipped with the above-described smart key-less entry system, a lock member operative to engage with or disengage from a steering shaft is driven by an actuator for steering lock. The drive of the actuator is controlled by a controller such that the lock member selectively takes a steering lock state or a steering unlock state (see Japanese Patent Laid-Open Publication Nos. 2001-1865, 2003-293923, for example).

Herein, the steering-lock actuator of the above-described burglarproof device may produce a relatively large drive noise (sound). Accordingly, it may be preferable in order to make this drive noise quite that the lock member be configured to selectively take the steering lock state or the unlock state at the time the door is opened or closed (the door state changes from the open state to the closed state, or its reverse) or the state of the door lock or unlock changes. Thus, the changing timing of making the lock member taking the steering lock state from the unlock state may overlap with the timing when the change in the door state, such as the door opening-closing state or the door lock-unlock state, is detected while the ignition switch is in an OFF state.

Further, it may be required from the safety point of view that the lock member be changed so as to take the steering lock state from the steering unlock state on condition that the vehicle stops. Thus, it may be preferable that the lock member be changed so as to take the steering lock state from the steering unlock state if the change in the door state is detected and the vehicle stop state is detected when the ignition switch is in the OFF state.

Herein, the vehicle stop state may be detected by a general vehicle speed sensor. Or, that state may be detected by a vehicle detecting device which is provided in a device or system (an anti-lock brake system, for example) which is different from the burglarproof device. In the latter manner, cost reductions may be achieved.

However, according to the above-described changing of the timing to the steering lock state, since it may be required that the above-described vehicle speed sensor, device, or system be made in an operational mode even while the ignition switch is the OFF state, there is a problem in that the so-called dark current would improperly increase because the small amount of power supply to these sensor, device or system continues during the time the ignition switch is the OFF state. If the ignition-switch OFF state was prolonged improperly because of a driver's taking a nap or the like without operating the door, this problem would be serious. Particularly, in a case in which the vehicle-speed detection by the vehicle speed device of the above-described device or system different from the burglarproof device is applied, the above-described dark current would tend to increase further greatly.

SUMMARY OF THE INVENTION

The present invention has been devised in view of the above-described problem, and an object of the present invention is to provide a burgalaproof device of a vehicle which can properly restrain the increase of the dark current during the ignition-switch OFF state, making the drive noise produced by the steering-lock actuator properly quite.

According to the present invention, there is provided a burglarproof device of a vehicle, comprising an ignition switch to be operated by a passenger of the vehicle, a vehicle-stop-state detecting device operative to detect a stop state of the vehicle, a power supply device operative to supply a power to the vehicle-stop-state detecting device for operating the vehicle-stop-state detecting device when the ignition switch is in an ON state, a door-state detecting device operative to detect a state of a vehicle door, a lock member operative to engage with a movable member associated with a steering operation for taking a steering lock state and disengage from the movable member for taking a steering unlock state, a steering-lock actuator operative to drive the lock member such that the lock member selectively takes the steering lock state or the steering unlock state, and a drive control device operative to control a drive of the steering-lock actuator, wherein the drive control device is configured so as to control the drive of the steering-lock actuator such that the lock member takes the steering lock state from the steering unlock state if there occurs a change in the state of the vehicle door detected by the door-state detecting device and the stop state of the vehicle is detected by the vehicle-stop-state detecting device when the ignition switch is in an OFF state, and the power supply device is configured such that a power supply to the vehicle-stop-state detecting device thereby stops if the ignition switch is turned to the OFF state from the ON state, and that the power supply to the vehicle-stop-state detecting device resumes if there occurs the change in the state of the vehicle door detected by the door-state detecting device when the ignition switch is in the OFF state.

According to the present invention, the power supply to the vehicle-stop-state detecting device stops if the ignition switch is turned to the OFF state from the ON state. This power-supply stop state is maintained until the change of the door state is detected by the door-state detecting device as long as the ignition switch is in the OFF state. As the change of the door-state (the door opening-closing state, or the door lock-unlock state) is detected (the power is supplied to the door-state detecting device even if the ignition switch is in the OFF state), the power supply to the vehicle-stop-state detecting device resumes. Thereby, in a case in which the vehicle stops, the vehicle-stop state is detected by this vehicle-stop-state detecting device. Thus, the lock member for steering is changed so as to take the steering lock state according to the detection of the vehicle-stop state. Herein, the time of the power supply to the vehicle-stop-state detecting device or the vehicle-stop-state detection by the vehicle-stop-state detecting device maybe considerably short, so that the occurrence timing of the drive noise of the steering-lock actuator can overlap with the occurrence timing of the door opening-closing noise or the door-lock actuator's drive noise (door lock noise). Accordingly, even if the drive noise of the steering-lock actuator itself was relatively large, that noise can be made properly quiet (unnoticeable) by being drowned by the door opening-closing noise or the door-lock actuator's drive noise to some extent. Further, since the stop of the power supply to the vehicle-stop-state detecting device is maintained until the change of the door state is detected by the door-state detecting device, even if the ignition-switch OFF state was prolonged improperly because of the driver's taking a nap or the like without operating the door, the increase of the dark current due to the operational mode of the vehicle-stop-state detecting device can properly restrained.

According to an embodiment of the present invention, the power supply device is configured such that the power supply to the vehicle-stop-state detecting device thereby stops after the lock member has taken the steering lock state from the steering unlock state. Thereby, the restraint of the dark-current increase due to the operational mode of the vehicle-stop-state detecting device can be achieved properly even after the change to the steering lock state of the lock member.

According to another embodiment of the present invention, the vehicle is equipped with an anti-lock brake system operative to control a braking force applied to a brake device so as to restrain a wheel lock at braking, and the vehicle-stop-state detecting device comprises a vehicle-speed detecting portion of the anti-lock brake system. Thereby, it may not be necessary to provide the vehicle-stop-state detecting device particularly for the burglarproof device, cost reductions can be achieved. Herein, it is generally required that the entire anti-lock brake system be made in an operational mode in order to activate the vehicle-speed detecting device of the anti-lock brake device, so that the dark current due to the power supply to this entire system would increase greatly if the ignition-switch OFF state was prolonged so long because of the driver's taking a nap or the like without operating the door. According to the present embodiment, however, the entire anti-lock brake system can be made in an OFF (not operational) mode even in a case in which the door opening-closing has not been conducted for a long time. Thereby, the restraint of the dark-current increase can be achieved effectively.

According to another embodiment of the present invention, the vehicle is equipped with a smart key-less entry system operative to operate an onboard controller, the smart key-less entry system being configured to enable operation of the onboard controller if an identification code transmitted from a wireless portable device which is to be carried by a passenger of the vehicle matches another identification code which is previously memorized by an onboard device of the smart key-less entry system, and the power supply device is configured to supply the power to the vehicle-stop-state detecting device via the onboard device of the smart key-less entry system. Thereby, since the power is supplied to the onboard device of the smart key-less entry system even if the ignition switch is in the OFF state, the power supply to the vehicle-stop-state detecting device can be conducted easily.

According to another embodiment of the present invention, the door-state detecting device is configured to detect a door opening-closing state or a door lock-unlock state as the state of the vehicle door. Thereby, the change in the door state can be detected easily, and making the drive noise of the steering-lock actuator properly quiet can be surely achieved.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
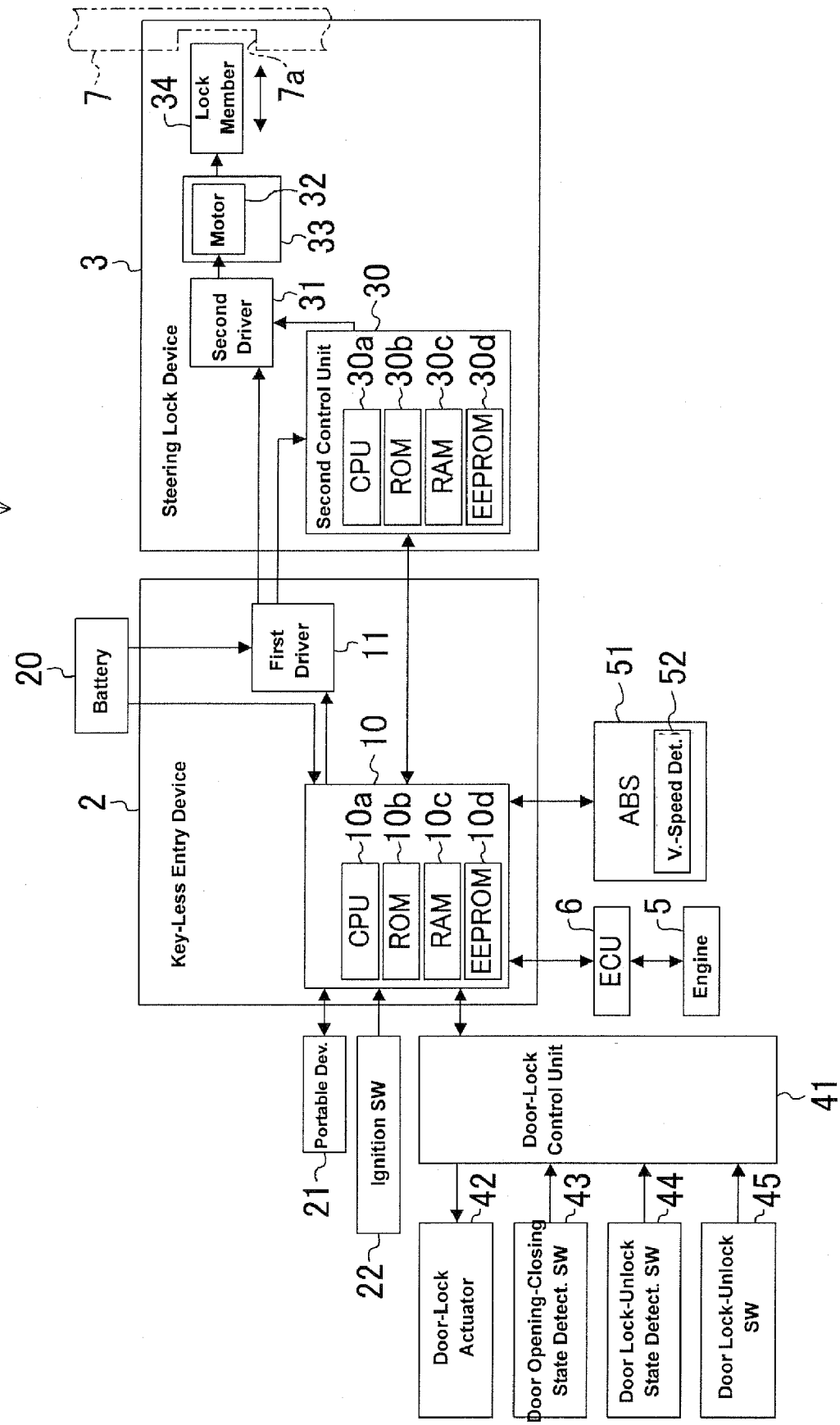
FIG. 1 is a block diagram showing constitution of a burglarproof device of a vehicle according to an embodiment of the present invention.

FIG. 1 shows construction of a burglarproof device 1 of a vehicle according to the present embodiment. The burglarproof device 1 comprises a key-less entry device 2 operative to enable lock/unlock of a door and start of an engine 5 without a mechanical key, and a steering lock device 3 operative to disable rotation of a steering shaft 7 as a movable member which moves according to a steering operation thereby disabling the steering operation. The engine 5 is controlled by an engine control unit (ECU) 6.

The key-less entry device 2 comprises a first control unit 10 and a first driver 11. The first control unit 10 includes CPU 10a to execute information processing, ROM 10b to memorize programs and data, RAM 10c to function as a main memory of the CPU 10a and provide the CPU 10a with a work area, and EEPROM (Electrically Erasable Program ROM) 10d. The EEPROM 10d previously memorizes a current lock-unlock state of the steering shaft 7 and a specified identification code.

The first control unit 10 is electrically coupled to the first driver 11, a push or rotational type of ignition switch 22, ECU 6, a door-lock control unit 41 and a second control unit 30, which will be described later. Further, the first control unit 10 is operative to have a wireless transmission with a portable device 21 which can transmit an identification code which is the same as the above-described specified identification code previously memorized by the EEPROM 10d. A power (Electric Power) of a battery 20 is supplied to the first control unit 10 and the first driver 11, and the first driver 11 is controlled by the first control unit 10. The power can be also selectively supplied from the first driver 11 to a second control unit 30 and a second driver 31 of the steering lock device 3, which will be described later. Further, the power can be selectively supplied from the first control unit 10 to the ECU 6 and the anti-lock brake system (ABS) 51. Also, the power is supplied from the first control unit 10 to the door-lock control unit 41 and respective switches 43-45, which will be described later, and the power can be selectively supplied from the door-lock control unit 41 to an actuator for door lock 42, which will be described later.

The ABS 51 controls a braking force applied to a brake device so as to restrain a wheel lock at braking of the vehicle and comprises a vehicle-speed detecting portion (device) 52 to detect a traveling speed of the vehicle. In the present embodiment, this vehicle-speed detecting portion 52 constitutes a vehicle-stop-state detecting device to detect a stop state of the vehicle. The stop state of the vehicle is detected when the vehicle speed indicates "zero" (herein, "zero" means the maximum value detected as the substantially zero speed, which may be 4 km/h, for example). Herein, the above-described vehicle-speed detection portion 52 may be comprised of a general vehicle-speed sensor. For example, respective rotational speeds of all wheels of the vehicle are detected by rotational-speed sensors, and the vehicle speed may be predicted from these rotational speeds of the vehicle wheels detected.

The door-lock control unit 41 controls a drive of the door-lock actuator 42 to lock or unlock the vehicle door. This control of the door-lock control unit 41 is conducted by selectively supplying the above-describe power to the door-lock actuator 42 based on commands from the first control unit 10. To the door-lock control unit 41 are coupled a door opening-closing state detecting switch 43 to detect an opening-closing state of the door, a door lock-unlock state detecting switch 44 to detect a lock-unlock state of the door, and a door lock-unlock switch 45 which is provided at or near an outer handle of the door. Data of these switches 43-45 is inputted to the door-lock control unit 41, and then inputted via this door-lock control unit 41 to the first control unit 10.

The door lock-unlock state detecting switch 44, which is provided at the vehicle door on the inside, detects an operational position of a lock knob which is operated by a passenger or a linkage member operative to move along with this lock knob (a link member coupling the lock knob and a lock mechanism, for example), thereby detecting the lock-unlock state of the door. The lock knob or the linkage member is moved by the passenger or the door-lock actuator 42. Accordingly, the lock-unlock state of the door can be detected by detecting the operational position of the lock knob or the linkage member.

The first control unit 10 is installed at the vehicle and constitutes an onboard device to receive the identification code from the portable device 21. The first control unit 10 enables the lock-unlock of the door if the identification code received matches the identification code which is previously memorized by the EEPROM 10d. in this state, when the passenger operates the door lock-unlock switch 45, command signals for the door lock or door unlock are transmitted from this door lock-unlock switch 45 to the first control unit 10. The first control unit 10 receives the command signals and makes the door-lock control unit 41 drive the door-lock actuator 42 so as to lock or unlock the door according to the command signals. Herein, the command signals of the door lock or door unlock may be transmitted to the first control unit 10 directly from the portable device which is equipped with operational switches for door lock or unlock according to the passenger's operation of these switches.

Further, the first control unit 10 enables the ignition switch 22 to be in the ON state if the identification code received by the first control unit 10 matches the identification code previously memorized by the EEPROM 10d in a state in which the portable device 21 is in a vehicle compartment. Namely, it enables operation of any onboard controller, including the engine 5. Thus, the first control unit 10 and the portable device 21 constitute the smart key-less entry system which enables the operation of the onboard controller if the identification code received by the first control unit 10 matches the identification code previously memorized by the first control unit 10.

According to the above-described smart key-less entry system, when the passenger operates the door lock-unlock switch 45 carrying the portable device 21 in order to get in the vehicle, the door is unlocked, thereby the passenger is allowed to get in the vehicle and then the ignition switch 22 is enabled to be in the ON state. Thus, the final operation of the ignition switch 22 by the passenger can allow the start of the engine 5.

Meanwhile, when the passenger makes the ignition switch 22 be in the OFF state after the vehicle has stopped and then operates the door lock-unlock switch 45 after getting off the vehicle carrying the portable device 21 and closing the door, the door is made be in the lock state.

Herein, the door lock or unlock is enabled by the operation of a mechanical key inserting into a key slot provided at the outer face of the door, and the start of the engine 5 is also enabled by the mechanical key inserting into another key slot provided at a steering column, thereby dealing with malfunction of the portable device 21, the battery being dead, and the like.

The steering lock device 3 comprises the second control unit 30, the second driver 31, a drive mechanism 33 including an electric motor 32 as the steering-lock actuator, and a lock member 34. The second control unit 30 comprises CPU 30a to execute data processing, ROM 30b to memorize programs and data, RAM 30c to function as a main memory of the CPU 30a and provide the CPU 30a with a work area, and EEPROM 30d. The EEPROM 30d memorizes the current lock-unlock state of the steering shaft 7.

The second control unit 30 is electrically coupled to the first control unit 10, the first driver 11 and the second driver 31, and it supplies to the first control unit 10 information regarding the lock-unlock state memorized by the EEPROM 30d. The first control unit 10 makes the EEPROM 10d memorize this information. The second driver 31 is controlled by the second control unit 30 so that the power can be selectively supplied to the electric motor 32 from the second driver 31. Herein, while the power is supplied to the electric motor 32, the electric motor 32 can be driven.

The lock member 34 engages with or disengages from an engagement portion 7a (recess portion) that is formed at the steering shaft 7 (i.e., steering), so that the state of the steering lock or unlock is selectively provided. The electric motor 32 drives the electric motor 32 so that the lock-unlock state of the steering shaft 7 can be selectively changed. Herein, the drive mechanism 33 includes gears for transmitting an output of the electric motor 32 to the lock member 34.

When the ignition switch 22 is in the OFF state, the power of the battery 20 is supplied to the first control unit 10, first driver 11, door-lock control unit 41 and respective switches 43-45, but not to the second control unit 30, second driver 31 and ABS 51 basically. Herein, when the timing for driving the electric motor 32 has come as described above, the power is supplied to the second control unit 30, second driver 31 and ABS 51, and further the second driver 31 is controlled by the second control unit 30 so that the power can be supplied to the electric motor 32. After the drive of the electric motor 32 is complete, the first control unit 10 receives information of its completion (update information of EEPROM 10d which will be described later) from the second control unit 30 and stops the power supply to the second control unit 30, second driver 31 and ABS 51. Herein, when the ignition switch 22 is in the OFF state, the power is not supplied to the ECU 6. The power is supplied when the ignition switch 22 is turned to the ON state. Also, when the ignition switch 22 is turned to the ON state, the power is supplied to the second control unit 30, second driver 31 and ABS 51.

The first control unit 10 outputs to the second control unit 30 a command signal to change the state of the lock or unlock of the steering shaft 7 at a specified timing which will be described later. The second control unit 30 receives the command signal and makes the second driver 31 drive the electric motor 32 such that the lock member 34 takes the lock state (i.e., its engaging position with the engagement portion 7a) or the unlock state (i.e., its disengaging position from the engagement portion 7a) of the steering shaft 7. Thus, the first and second control units 10, 30 constitute a drive control device to control the drive of the electric motor 32 (the steering-lock actuator). After the change of the lock-unlock state of the steering shaft 7 is complete, the second control unit 30 stops the power supply to the electric motor 32 and updates the information of the lock-unlock state memorized by the EEPROM 10d and supplies the updated information to the first control unit 10.

The first and second control units 10, 30 operate as follows to change the state of the steering shaft 7 from the unlock state to the lock state.

If there occurs the change in the state of the vehicle door detected by the door opening-closing state detecting switch 43 (the door state changes from the opening state to the closing state in the present embodiment) and the stop state of the vehicle is detected by the vehicle-speed detecting portion 52 when the steering shaft 7 is in the unlock state and the ignition switch 22 is in the OFF state, the first control unit 10 outputs to the second control unit 30 the command signal for changing to the lock state of the steering shaft 7 and thereby the second control unit 30 drives the electric motor 32 such that the state of the steering shaft 7 is changed from the unlock state to the lock state. Herein, it may be detected that the door state changes from the closing state to the opening state as the detection of the change in the state of the vehicle door.

More specifically, if the ignition switch 22 is turned to the OFF state from the ON state, the first control unit 10 stops the power supply to the second control unit 30, second driver 31 and ABS 51. Then, if there occurs the change in the state of the vehicle door detected by the door opening-closing state detecting switch 43 (the door state changes from the opening state to the closing state) when the ignition switch 22 is in the OFF state after the power-supply stop, the first control unit 10 supplies the power of the battery 20 to the second control unit 30, second driver 31 and ABS 51. Thus, the ABS 51 operates and the vehicle speed is detected by the vehicle-speed detecting portion 52, and the vehicle-speed information is supplied from the ABS 51 to the first control unit 10. And, if the stop state of the vehicle is detected based on the vehicle-speed information, the first control unit 10 outputs to the second control unit 30 the command signal for changing to the lock state of the steering shaft 7, and the second control unit 30 drives the electric motor 32 such that the state of the steering shaft 7 is changed from the unlock state to the lock state.

When the change to the lock state of the steering shaft 7 is complete, the second control unit 30 stops the power supply to the electric motor 32, updates the memorized information of the EEPROM 10d to the "lock state," and supplies this updated information to the first control unit 10. The first control unit 10 stops the power supply to the second control unit 30, second driver 31 and ABS 51.

Herein, in a case in which the vehicle is traveling or the malfunction of the vehicles-speed detecting portion 52 occurs when it is determined whether the vehicle is in the stop state or not, the first control unit 10 determines that the vehicle is not in the stop state. In this case, the first control unit 10 awaits the change to the vehicle-stop state for a specified time from the start of the power supply to the ABS 51 and the like (30 minutes, for example, which may be the maximum time of the vehicle traveling while the ignition switch 22 is in the OFF state, or the time to enable suppressing of damage of the battery 20), and outputs the command signal for changing the state of the steering shaft 7 to the lock state to the second control unit 30 after the vehicle state has changed to the stop state. If the change to the vehicle-stop state has not occurred for the above-described specified time, the first control unit 10 stops the power supply to the ABS 51 and the like.

Meanwhile, if there occurs no change in the state of the vehicle door detected by door opening-closing state detecting switch 43 when the steering shaft 7 is in the unlock state and the ignition switch 22 is in the OFF state, the first control unit 10 does not output to the second control unit 30 the command signal for changing to the lock state of the steering shaft 7. That is, the steering shaft 7 is not changed to the lock state.

Herein, when the passenger carrying the portable device 21 operates the door lock-unlock switch 45 to get in the vehicle as described above, the door state becomes the door-unlock state. At this timing or a later timing when the door state changes from the closing state to the opening state, the first control unit 10 supplies the power to the second control unit 30, second driver 31 and ABS 51, and outputs the command signal for changing the state of the steering shaft 7 from the lock state to the unlock state. When the ignition switch 22 is turned to the ON state at the lock state of the steering shaft 7, the first control unit 10 supplies the power to the second control unit 30, second driver 31 and ABS 51, and outputs the command signal for changing the state of the steering shaft 7 to the unlock state. Accordingly, the state of the steering shaft 7 is changed to the unlock state.

According to the present embodiment, the first control unit 10 constitutes the power supply device which supplies the power for operating the vehicle-speed detecting portion 52 to the vehicle-speed detecting portion 52 of the ABS 51, in addition to the onboard device, when the ignition switch 22 is in the ON state. Accordingly, the power is supplied to the vehicle-speed detecting portion 52 via the onboard device. The door opening-closing state detecting switch 43 constitutes the door-state detecting device to detect the opening-closing state of the vehicle door.

Figure 2:
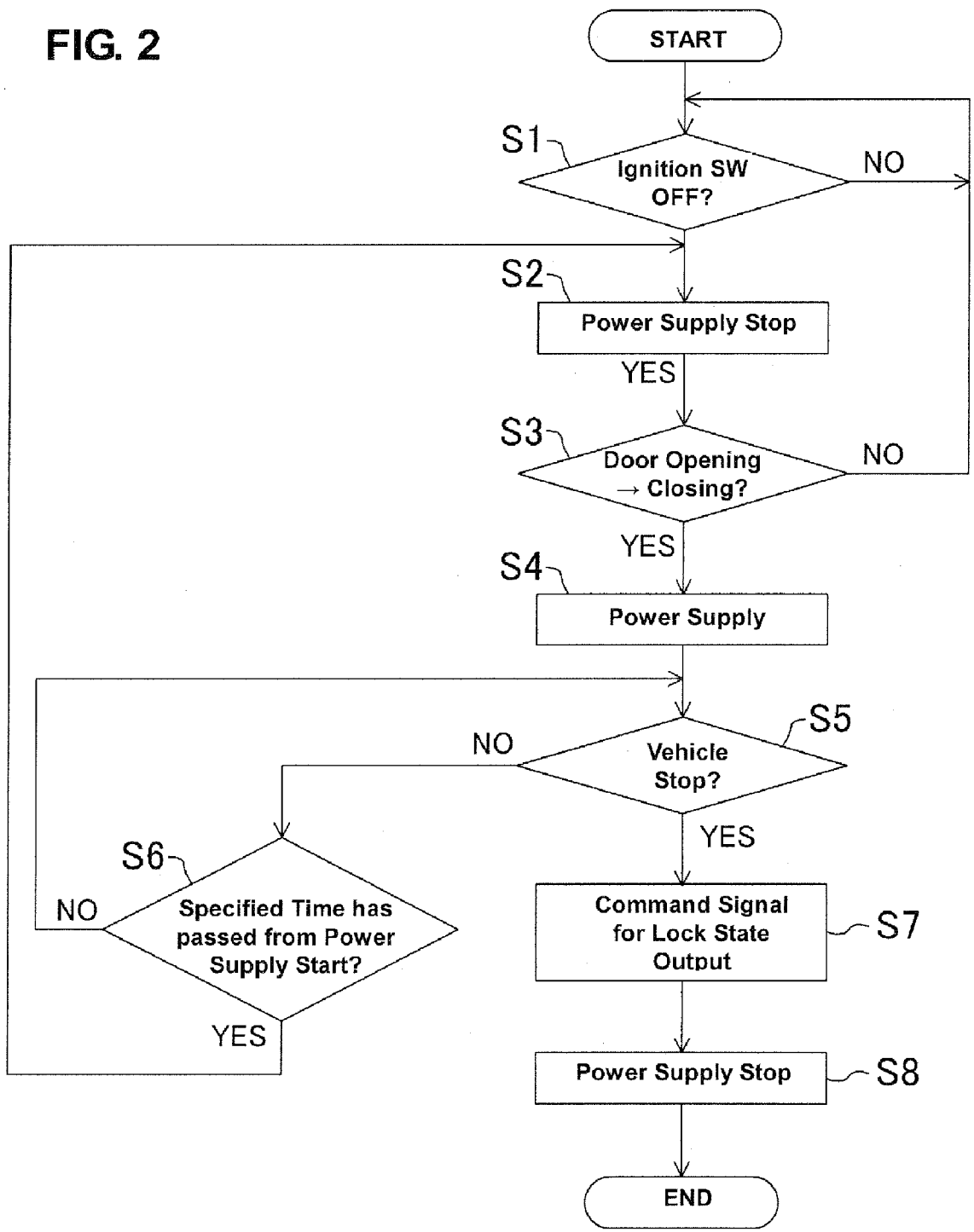
FIG. 2 is a flowchart of processing of controlling a lock state of a steering shaft, which is conducted by a first control unit.

Hereinafter, the processing of changing to the lock state of the steering shaft 7 which is executed by the first control unit 10 will be described referring to a flowchart of FIG. 2.

At first, in step S1 it is determined whether the ignition switch is in the OFF state or not. When the determination in the step S1 is NO, this processing in the step S1 is repeated. When the determination in the step S1 is YES, the control sequence proceeds to step S2, where the power supply to the second control unit 30, second driver 31 and ABS 51 is stopped. Then, the control sequence proceeds to step S3.

It is determined in the step S3 whether the door state changes from the opening state to the closing state or not. When the determination in the step S3 is NO, the control sequence returns to the step S1. When the determination in the step S3 is YES, the control sequence proceeds to step S4, where the power is supplied to the second control unit 30, second driver 31 and ABS 51. Then, the control sequence proceeds to step S5.

It is determined in the step S5 whether the vehicle is in the stop state or not. When the determination in the step S5 is NO, the control sequence returns to the step S6. When the determination in the step S5 is YES, the control sequence proceeds to step S7.

It is determined in the step S6 whether or not the above-described specified time has passed from the power supply in the step S4. When the determination in the step S6 is NO, the control sequence returns to the step S5. When the determination in the step S6 is YES, the control sequence returns to the step S2.

In the step S7, the command signal for changing the steering shaft 7 to the lock state is output to the second control unit 30. Then, in the next step S8, the power supply to the second control unit 30, second driver 31 and ABS 51 is stopped. This changing processing ends.

Figure 3:
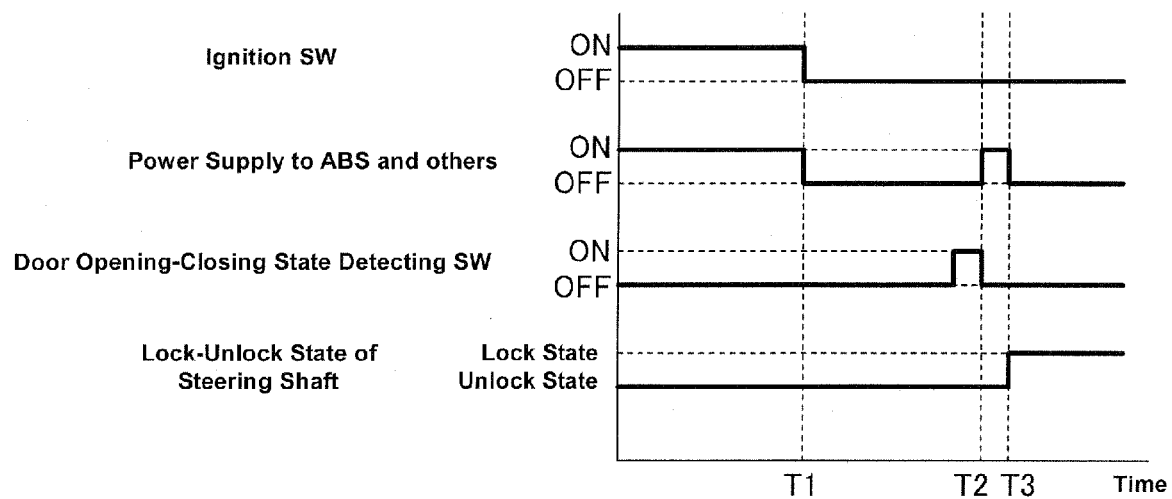
FIG. 3 is a time chart at the time a passenger gets off a vehicle with an ignition switch in an OFF state.

According to the processing of the first and second control units 10, 30, the power supply is stopped (see T1 of FIG. 3) when the passenger operates the ignition switch 22 to be in the OFF state after the vehicle has stopped (at this moment, the steering shaft 7 is in the unlock state). Then when the passenger with the portable device 21 opens the door and gets off the vehicle closing the door behind, the power supply to the ABS 51 and the others is supplied (see T2 of FIG. 3). When it is determined by the vehicle-speed information from the vehicle-speed detecting portion 52 of the ABS 51 that the vehicle is in the stop state, the state of the steering shaft 7 is changed from the unlock state to the lock state. After this change is complete, the power supply to the ABS 51 and the like stops (see T3 of FIG. 3). Herein, the time of the power supply to the ABS 51 and the like and the vehicle-stop-state detection (the time between T2 and T3 of FIG. 3) is considerably short, so the electric motor 32 is driven substantially at the same time as the door closing. Accordingly, the occurrence of the drive noise of the electric motor 32 overlaps with the occurrence of the door-closing noise (sound), so that the drive noise of the electric motor can be made properly quite. Herein, the power of the battery 20 may be supplied to the second control unit 30, second driver 31 and ABS 51 when the door state changes from the closing state to the opening state, thereby obtaining the vehicle-speed information from the ABS 51. After this, when it is detected that the door state changes from the opening state to the closing state, the state of the steering shaft 7 may be changed to the lock state. Thereby, the occurrence of the drive noise of the electric motor 32 may more surely overlap with the occurrence of the door-closing noise (sound).

In case the driver takes a nap while the ignition-switch 22 is in the OFF state after vehicle has stopped, the door may be not operated (opening-closing) for a long time. In this case, the dark current may increase if the power supply to the ABS 51 continues to obtain the vehicle-speed information from the ABS 51 when the door opening-closing state changes. According to the present embodiment, however, since the power supply to the ABS 51 and the like is stopped when the ignition switch 22 is turned to the OFF state, the increase of the dark current can be restrained even when the door opening-closing has not occurred for a long time. Further, the power is supplied to the ABS 51 when the door opening-closing state changes, thereby obtaining the vehicle-speed infonnation, so that the detection of the vehicle stop state can be conducted properly. Since the power supply to the ABS 51 and the like is stopped after the change of the steering shaft 7 to the lock state is complete, the increase of the dark current can be restrained.

Although the door opening-closing state as the door state is detected by the door opening-closing state detecting switch 43 in the above-described embodiment, the door lock-unlock state as the door state may be detected by the door lock-unlock state detecting switch 44. In this case, if the change of the door lock-unlock state is detected by the door lock-unlock state detecting switch 44 (the change from the lock state to the unlock state, or the change from the unlock state to the lock state) when the steering shaft 7 is in the unlock state and the ignition switch 22 is in the OFF state, the power may be supplied to the ABS 51 and the like. And, when the vehicle stop state is detected by the vehicle-speed information from the ABS 51, the steering shaft 7 may be changed to the lock state.

Although the vehicle-stop state detecting device is comprised of the vehicle-speed detecting portion 52 of the ABS 51 in the above-described embodiment, a vehicle-speed detecting portion of any other system or device may be applied. Also, a vehicle sensor or the like which is provided particularly for the present burglarproof device may be used.

Further, although the vehicle of the above-described embodiment is equipped with the smart key-less entry system, the present invention may be applied to any vehicle without the smart key-less entry system as long as the vehicle has the burglarproof device operative to change the steering lock-unlock state by the steering-lock actuator.

The present invention should not be limited to the above-described embodiment, and any other modifications and improvements may be applied within the scope of a sprit of the present invention.

What is claimed is:

1. A burglarproof device of a vehicle, comprising:
   an ignition switch to be operated by a passenger of the vehicle;
   a vehicle-stop-state detecting device operative to detect a stop state of the vehicle;
   a power supply device operative to supply a power to the vehicle-stop-state detecting device for operating the vehicle-stop-state detecting device when the ignition switch is in an ON state;
   a door-state detecting device operative to detect a state of a vehicle door;
   a lock member operative to engage with a movable member associated with a steering operation for taking a steering lock state and disengage from the movable member for taking a steering unlock state;
   a steering-lock actuator operative to drive the lock member such that the lock member selectively takes the steering lock state or the steering unlock state; and
   a drive control device operative to control a drive of the steering-lock actuator,
   wherein said drive control device is configured so as to control the drive of the steering-lock actuator such that the lock member takes the steering lock state from the steering unlock state if there occurs a change in the state of the vehicle door detected by the door-state detecting device and the stop state of the vehicle is detected by the vehicle-stop-state detecting device when the ignition switch is in an OFF state, and
   said power supply device is configured such that a power supply to the vehicle-stop-state detecting device thereby stops if the ignition switch is turned to the OFF state from the ON state, and that the power supply to the vehicle-stop-state detecting device resumes if there occurs the change in the state of the vehicle door detected by the door-state detecting device when the ignition switch is in the OFF state.

2. The burglarproof device of a vehicle of claim 1, wherein said power supply device is configured such that the power supply to the vehicle-stop-state detecting device thereby stops after the lock member has taken the steering lock state from the steering unlock state.

3. The burglarproof device of a vehicle of claim 1, wherein the vehicle is equipped with an anti-lock brake system operative to control a braking force applied to a brake device so as to restrain a wheel lock at braking, and said vehicle-stop-state detecting device comprises a vehicle-speed detecting portion of the anti-lock brake system.

4. The burglarproof device of a vehicle of claim 1, wherein the vehicle is equipped with a smart key-less entry system operative to operate an onboard controller, the smart key-less entry system being configured to enable operation of the onboard controller if an identification code transmitted from a wireless portable device which is to be carried by a passenger of the vehicle matches another identification code which is previously memorized by an onboard device of the smart key-less entry system, and said power supply device is configured to supply the power to the vehicle-stop-state detecting device via the onboard device of the smart key-less entry system.

5. The burglarproof device of a vehicle of claim 1, wherein said door-state detecting device is configured to detect a door opening-closing state or a door lock-unlock state as the state of the vehicle door.

* * * * *